United States Patent [19]

Collins, Jr. et al.

[11] Patent Number: 6,161,758
[45] Date of Patent: Dec. 19, 2000

[54] MODULAR BAR CODE SCANNER AND SCALE ASSEMBLY

[75] Inventors: Donald A. Collins, Jr., Duluth; Rex A. Aleshire, Buford; Douglas A. Baehl; Stephen J. Ames, both of Lawrenceville, all of Ga.

[73] Assignee: NCR Corporation, Dayton, Ohio

[21] Appl. No.: 08/392,598

[22] Filed: Feb. 23, 1995

[51] Int. Cl.[7] ................................................ G06K 7/10
[52] U.S. Cl. .......................... 235/462.01; 235/462.01; 177/4; 177/25.14
[58] Field of Search ..................... 235/462.01; 177/4, 177/25.14, 25.15, 245

[56] References Cited

U.S. PATENT DOCUMENTS

| | | | |
|---|---|---|---|
| 3,559,728 | 2/1971 | Lyman et al. ............................... | 165/55 |
| 3,594,549 | 7/1971 | Frank et al. ...................... | 235/61.11 E |
| 4,308,417 | 12/1981 | Martin .................................. | 174/35 GC |
| 4,488,679 | 12/1984 | Bockholt et al. ..................... | 235/472 X |
| 4,507,744 | 3/1985 | McFiggans et al. ...................... | 364/708 |
| 4,540,232 | 9/1985 | Zibung ...................................... | 339/198 G |
| 4,643,333 | 2/1987 | Martin ...................................... | 220/345 |
| 4,656,344 | 4/1987 | Mergenthaler et al. ................. | 235/462 |
| 4,700,656 | 10/1987 | Cone et al. .......................... | 235/462 X |
| 4,727,456 | 2/1988 | Mehta et al. ............................. | 361/417 |
| 4,879,650 | 11/1989 | Kurimoto et al. ....................... | 364/405 |
| 4,881,606 | 11/1989 | Halfon et al. ........................ | 177/245 X |
| 4,885,707 | 12/1989 | Nichol et al. ......................... | 235/375 X |
| 4,899,254 | 2/1990 | Ferchau et al. ........................... | 361/384 |
| 4,971,176 | 11/1990 | Nojiri et al. ............................... | 186/61 |
| 4,971,177 | 11/1990 | Nojiri et al. .......................... | 177/245 X |
| 4,977,532 | 12/1990 | Borkowicz et al. .................... | 364/708 |
| 4,983,818 | 1/1991 | Knowles .................................. | 235/472 |
| 5,008,518 | 4/1991 | Taussig et al. ....................... | 235/462 X |
| 5,033,562 | 7/1991 | Cone ........................................ | 177/128 |
| 5,059,778 | 10/1991 | Zouzoulas et al. ...................... | 235/372 |
| 5,060,113 | 10/1991 | Jacobs ..................................... | 361/386 |
| 5,060,990 | 10/1991 | Smith et al. ............................... | 292/91 |
| 5,086,879 | 2/1992 | Latimer et al. ........................... | 186/61 |
| 5,105,339 | 4/1992 | Olsson et al. ........................... | 361/399 |
| 5,139,100 | 8/1992 | Brauneis ............................. | 177/25.15 |
| 5,143,164 | 9/1992 | Nahar ....................................... | 177/50 |
| 5,160,357 | 11/1992 | Faber ..................................... | 55/385.2 |
| 5,174,399 | 12/1992 | Bruneis ............................... | 177/25.15 |
| 5,218,188 | 6/1993 | Hanson .................................. | 235/375 |
| 5,347,115 | 9/1994 | Sherman et al. ........................ | 235/472 |
| 5,355,193 | 10/1994 | Morris ....................................... | 355/41 |
| 5,500,606 | 3/1996 | Holmes ................................... | 324/761 |

*Primary Examiner*—Donald Hajec
*Assistant Examiner*—Daniel S Felten
*Attorney, Agent, or Firm*—Paul W. Martin

[57] ABSTRACT

A modular bar code scanner and scale assembly which does not use wire cables to connect a bar code scanner to a scale. The assembly includes a bar code scanner including a first printed circuit board having a connector, and a scale including a second printed circuit board having a connector which directly couples to the connector of the first printed circuit board when the scanner is coupled to the scale.

2 Claims, 5 Drawing Sheets

MODULAR BAR CODE SCANNER AND SCALE ASSEMBLY

CROSS REFERENCE TO RELATED APPLICATIONS

The present invention is related to the following commonly assigned and co-pending U.S. applications:

"Vertically Mounted Bar Code Scanner Assembly", invented by Collins et al., having a Ser. No. 08/392,561, and filed Feb. 23, 1995; and "Universal Mounting Apparatus and Method For Bar Code Scanners", invented by Collins et al., having a Ser. No. 08/392,581, and filed Feb. 23, 1995.

BACKGROUND OF THE INVENTION

The present invention relates to optical bar code scanners, and more specifically to a modular bar code scanner and scale assembly.

Bar code scanners are well known for their usefulness in retail checkout and inventory control. Bar code scanners generally employ a single laser source, the light from which is collimated and focused to produce a scanning beam. They may additionally employ a mirrored spinner to direct the beam against a plurality of stationary mirrors, and a detector to collect the beam after it is reflected by a bar code label. The pattern produced by such a scanner is characterized by lines oriented at various angles to one another.

Bar code scanners and scales are typically integrated into a single assembly with a load cell located near the center of the integrated assembly. The scale circuitry is integrated with the scanner circuitry. One disadvantage of this design is that two different types of scanners must be produced, one with a scale and one without.

Therefore, it would be desirable to provide a modular bar code scanner design in which the scanner and scale components are manufactured as separate modular components which may be easily coupled for those customers requiring a scanner with a scale.

SUMMARY OF THE INVENTION

In accordance with the teachings of the present invention, a modular bar code scanner and scale assembly are provided. The assembly includes a bar code scanner including a first printed circuit board having a connector, and a scale including a second printed circuit board having a connector which directly couples to the connector of the first printed circuit board when the scanner is coupled to the scale.

It is feature of the present invention that the assembly is modular in design. The scale and the scanner are separate modules. Thus, one version of the scanner can be manufactured for use with or without the scale.

It is another feature of the present invention that the assembly does not employ a wire cable to couple the scanner to the scale. A direct printed circuit board-to-printed circuit board connection is made.

It is accordingly an object of the present invention to provide a modular bar code scanner and scale assembly.

It is another object of the present invention to minimize noise by directly coupling the scanner to the scale without the use of wire cables.

It is another object of the present invention to provide a firmware access door on the scanner to expose the printed circuit board within the scanner and to simplify scanner diagnostics and firmware replacement.

BRIEF DESCRIPTION OF THE DRAWING

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
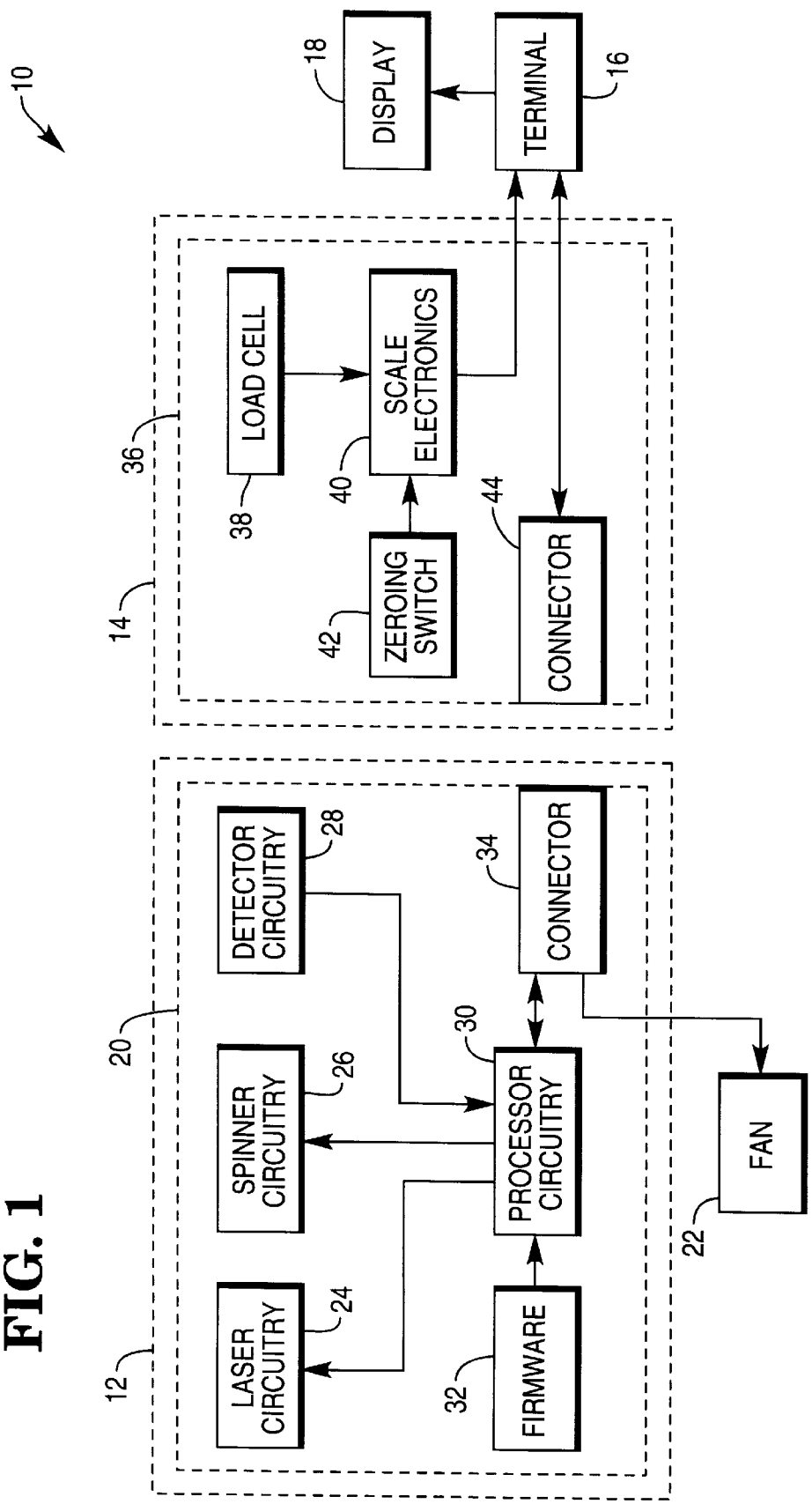
FIG. 1 is a block diagram of a retail system.
Figure 2:
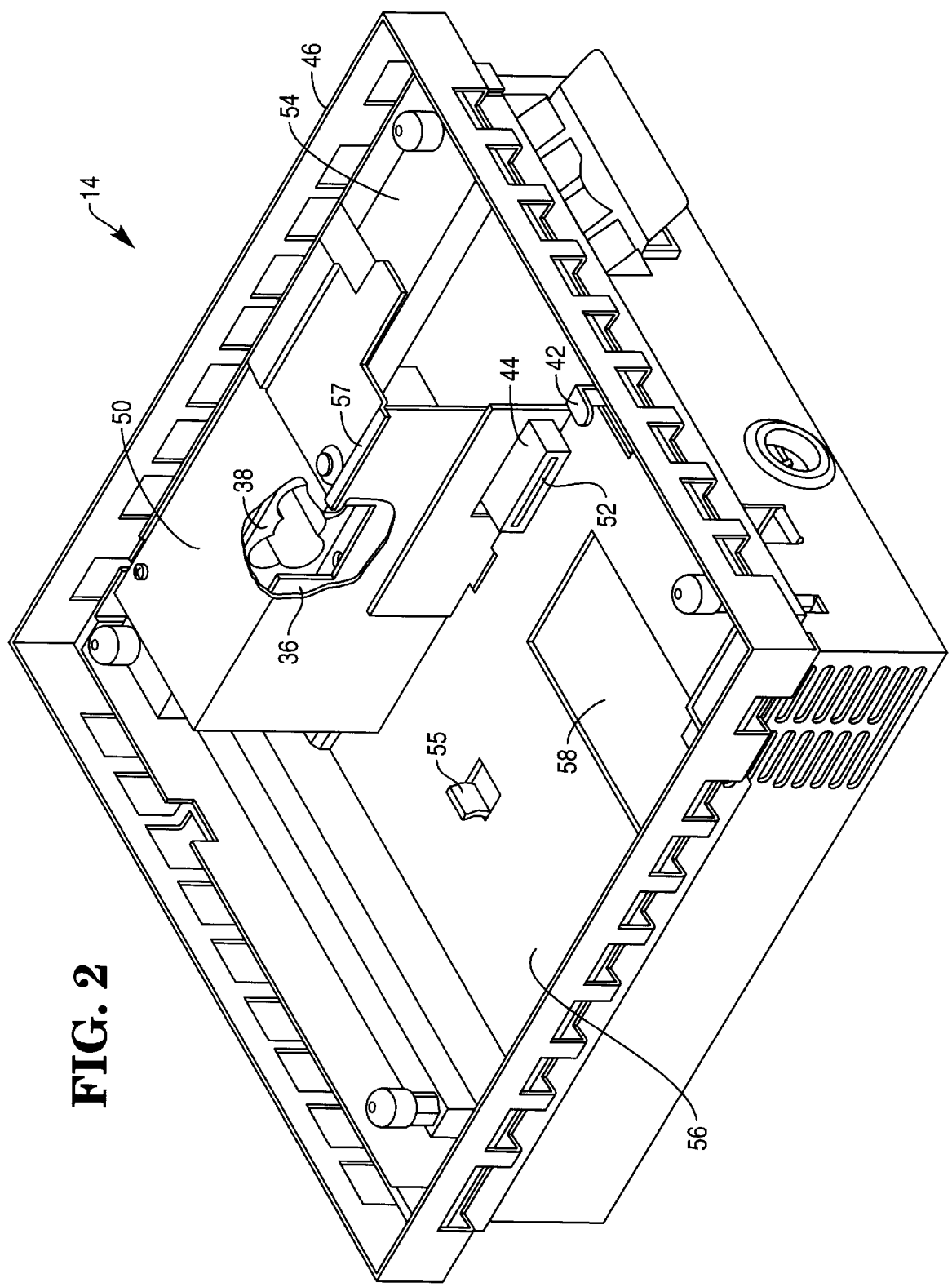
FIG. 2 is perspective view of the scanner assembly.

Referring now to FIGS. 1 and 2, retail system 10 includes scanner 12, scale 14, terminal 16, and display 18.

Scanner 12 includes scanner printed circuit board (PCB) 20, and cooling fan 22.

Scanner PCB 20 includes typical scanner components, such as laser circuitry 24, spinner circuitry 26, detector circuitry 28, processing circuitry 30, and firmware 32.

In accordance with the present invention, scanner PCB 20 includes connector 34. Connector 34 may also provide an auxiliary port for coupling scanner 12 to terminal 16 using a wire cable for applications not requiring scale 14.

Scale 14 includes scale PCB 36, which includes load cell 38 and scale circuitry 40. Scale PCB 36 is coupled to terminal 16 through wire cable connections known in the art. Scale 14 may also include scale zeroing switch 42, which zeroes scale 14 each time scanner 12 is reinserted.

Scale PCB 36 includes connector 44 which provides power and signal connections to scanner PCB 20. Preferably, connector 44 also provides power to fan 22 and provides a display connection to scanner PCB 20. To minimize noise, connector 34 couples directly to connector 44 without requiring a wire cable.

Figure 4:
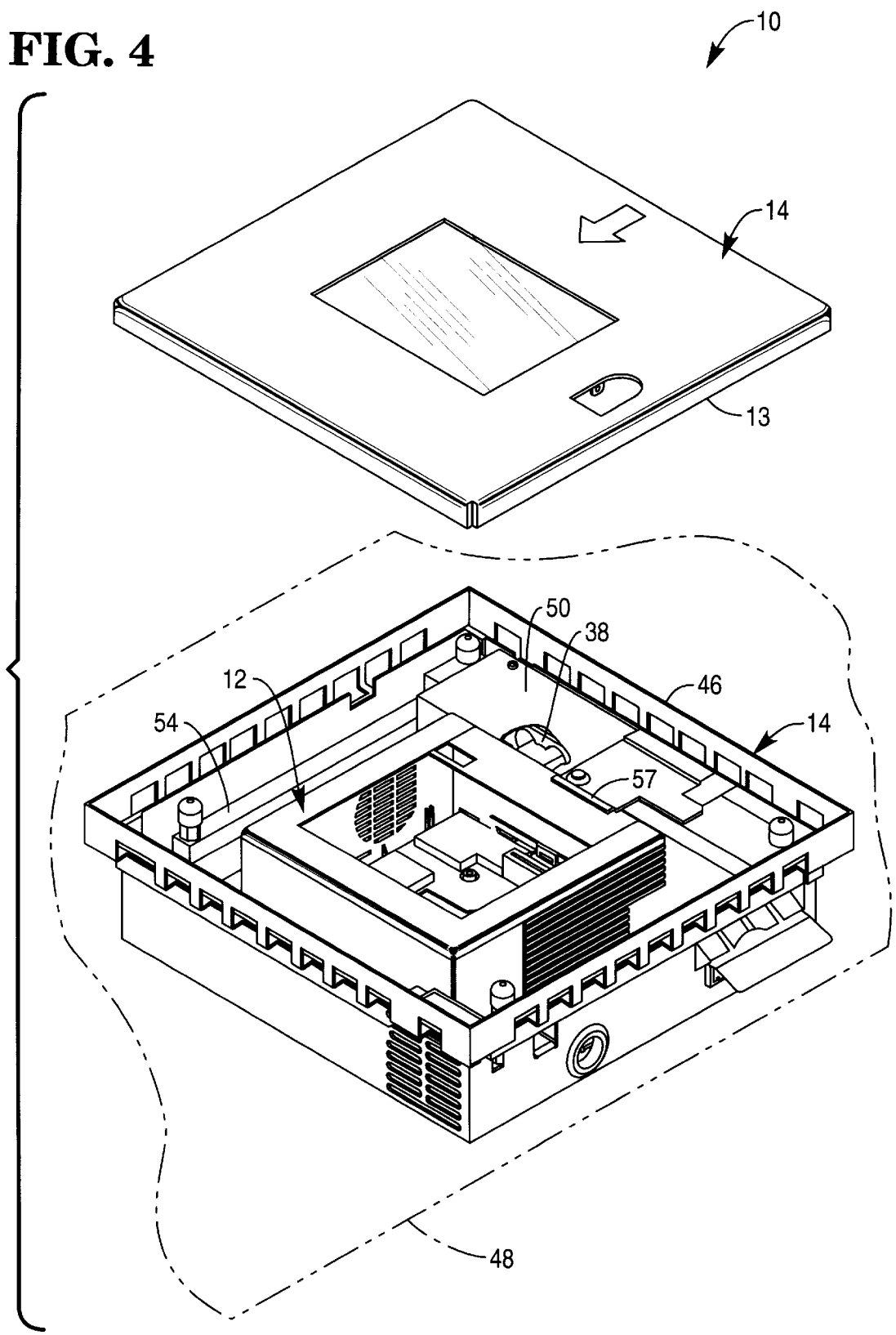
FIGS. 4 and 5 is a perspective view of the scanner housing showing a second connector.

Turning now to FIG. 2, scale 14 includes mounting frame 46, which is fastened to a checkout counter 48 (FIG. 4). Frame 46 contains scale PCB 36 and load cell 38 within scale electronics housing 50. Scale PCB 36 is mounted vertically within scale 14. Connector 44 is preferably a standard printed circuit board connector which has a channel 52 into which connector 34 is inserted.

Frame 46 includes additional features. Weigh plate support 54 rests upon load cell 38 and has a shape which does not obstruct insertion or removal of scanner 12. Flange 55 provides a rigid stop against which scanner 12 rests. Flange 57 secures scanner 12 within frame 46. Finally, bottom wall 56 includes aperture 58 which provides operator access to scanner 12 from below frame 46.

Figure 3:
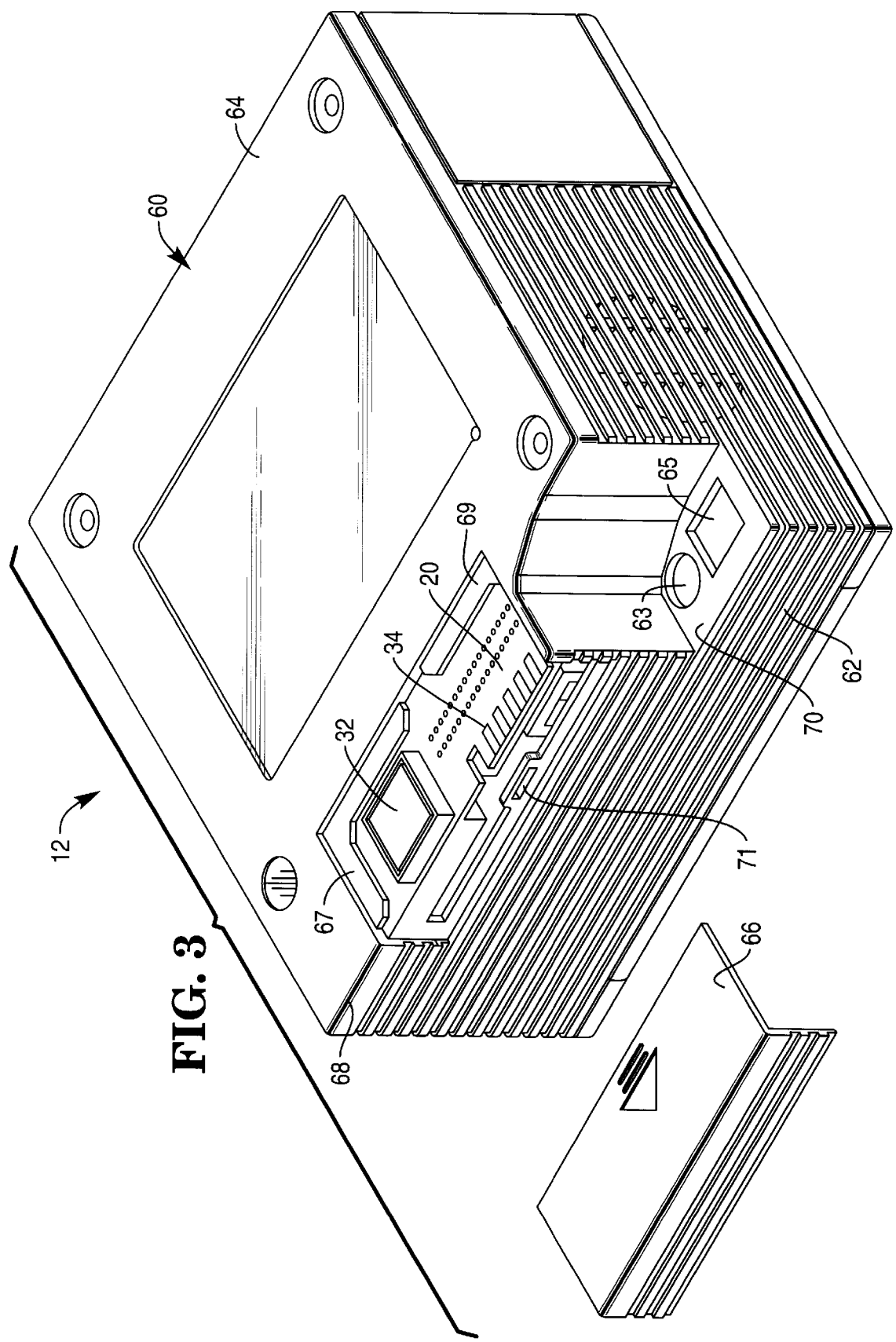
FIG. 3 is a perspective view of the scale portion showing a first connector.

With reference to FIG. 3, scanner 12 includes housing 60 which is generally box-like in shape. PCB 20 is located horizontally on the bottom of housing 60. Middle surface 70 contacts zeroing switch 42. Side 62 contacts scale electronics housing 50 when scanner 12 is installed. Power and signal connectors 65 and 63 are located on middle surface 70.

Removable access panel 66 is located along edge 68 at the junction of side 62 with bottom side 64. Panel 66 slides outward along guide flanges 67 and 69, and snaps within retaining aperture 71. When removed, removable access panel 66 exposes connector 34 and firmware 32. Connector 34 is formed as part of PCB 18 in a manner well known in the art. Firmware 32 may be easily replaced. Removable access panel 66 may be installed when scanner 12 is removed from frame 46 to protect connector 34 and scanner PCB 20.

Figure 5:
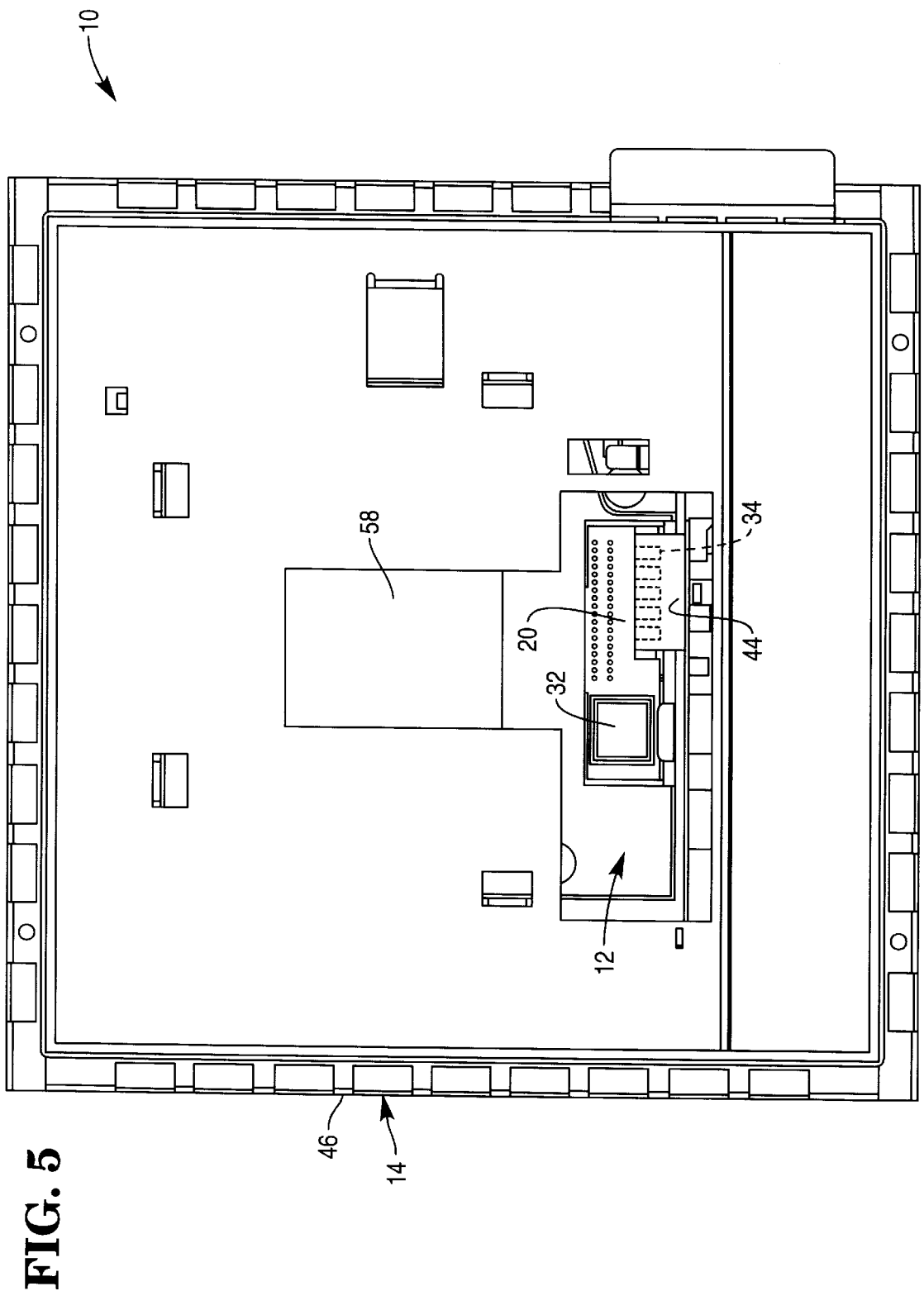

With reference to FIGS. 4 and 5, scanner 12 is installed within scale 14. To install scanner 12, access panel 66 is removed, scanner 12 is inserted into frame 46, scanner 12 is positioned to align connectors 34 and 44 with one another, and force is applied to insert connector 34 into connector 44. Flange 57 is then installed to secure scanner 12. Weigh plate 13 rests on weigh plate support 54.

Advantageously, only a single version of scanner 12 must be manufactured, which reduces manufacturing costs. If scale 14 is required, it may be easily installed with scanner 12 in modular fashion. Finally, the connection between scale 14 and scanner 12 is made without using wire cables to limit noise that might otherwise occur due to the modular design of the scanner-scale assembly.

Although the present invention has been described with particular reference to certain preferred embodiments thereof, variations and modifications of the present invention can be effected within the spirit and scope of the following claims.

What is claimed is:

1. A bar code reader assembly, comprising:

a mounting frame within a checkout counter;

a load cell assembly within the mounting frame including a first printed circuit board having a connector;

a bar code reader including a housing containing a second printed circuit board having a connector, wherein the housing includes an aperture exposing the connector of the second printed circuit board;

wherein the bar code reader is removably connected to the load cell assembly through the connector of the second printed circuit board, which directly couples to the connector of the first printed circuit board after the bar code reader is inserted within the mounting frame and coupled to the load cell assembly; and a switch coupled to the first printed circuit board which zeroes the load cell assembly when the bar code reader is inserted into the frame to activate the switch.

2. A scale mounting frame for a bar code reader comprising:

a box-like container;

a load cell assembly within the container including a printed circuit board; and a switch coupled to the printed circuit board which zeroes the load cell assembly after a bar code reader is inserted into the container and activates the switch.

* * * * *